(12) United States Patent
Kliland et al.

(10) Patent No.: US 8,230,091 B2
(45) Date of Patent: Jul. 24, 2012

(54) SYSTEM AND METHOD FOR REAL-TIME BIDIRECTIONAL COMMUNICATION THROUGH FIREWALLS

(75) Inventors: Kevin Kliland, Oslo (NO); Knut Farner, Lier (NO)

(73) Assignee: LifeSize Communications, Inc., Austin, TX (US)

( * ) Notice: Subject to any disclaimer, the term of this patent is extended or adjusted under 35 U.S.C. 154(b) by 128 days.

(21) Appl. No.: 12/546,366

(22) Filed: Aug. 24, 2009

(65) Prior Publication Data

US 2010/0011115 A1 Jan. 14, 2010

Related U.S. Application Data

(63) Continuation of application No. 10/931,492, filed on Sep. 1, 2004, now abandoned.

(30) Foreign Application Priority Data

Sep. 5, 2003 (NO) .................................. 20033938

(51) Int. Cl.
*G06F 15/16* (2006.01)
(52) U.S. Cl. ........................ 709/230; 709/227
(58) Field of Classification Search .................. 709/230, 709/227
See application file for complete search history.

(56) References Cited

U.S. PATENT DOCUMENTS

| | | | |
|---|---|---|---|
| 6,687,245 B2 | 2/2004 | Fangman et al. | |
| 7,017,162 B2 * | 3/2006 | Smith et al. | 719/328 |
| 7,734,909 B1 * | 6/2010 | Roush et al. | 713/154 |
| 2002/0016839 A1 * | 2/2002 | Smith et al. | 709/224 |
| 2002/0032725 A1 | 3/2002 | Araujo et al. | |
| 2002/0038371 A1 | 3/2002 | Spacey | |
| 2002/0056006 A1 | 5/2002 | Vange et al. | |
| 2002/0150083 A1 | 10/2002 | Fangman et al. | |
| 2002/0172158 A1 | 11/2002 | Hoefelmeyer et al. | |
| 2002/0184373 A1 | 12/2002 | Meas | |
| 2003/0041108 A1 | 2/2003 | Herrick et al. | |
| 2003/0059005 A1 | 3/2003 | Meyerson et al. | |
| 2003/0093563 A1 | 5/2003 | Young et al. | |
| 2003/0149930 A1 * | 8/2003 | Rey et al. | 714/776 |
| 2004/0044771 A1 * | 3/2004 | Allred et al. | 709/227 |
| 2004/0064512 A1 | 4/2004 | Arora et al. | |
| 2004/0249958 A1 * | 12/2004 | Ozdemir et al. | 709/229 |

FOREIGN PATENT DOCUMENTS

| | | |
|---|---|---|
| EP | 1081918 A2 | 3/2001 |
| EP | 1513315 A1 | 3/2005 |
| WO | WO 02/11389 A2 | 2/2002 |

* cited by examiner

*Primary Examiner* — Asad M Nawaz
*Assistant Examiner* — Marie Georges Henry

(57) ABSTRACT

A system and method for real-time data transmission through data communication networks are disclosed. The system and the method allow for real time communication between applications located in different internal networks protected by firewalls by means of representing the applications by proxies and establishing TCP channels towards an intermediate proxy server localized outside the firewalls. A set of parameters residing in the server determines i.a. the number of required TCP channels based on the ratio of measured bandwidth between the data flow directions.

Figure 1:
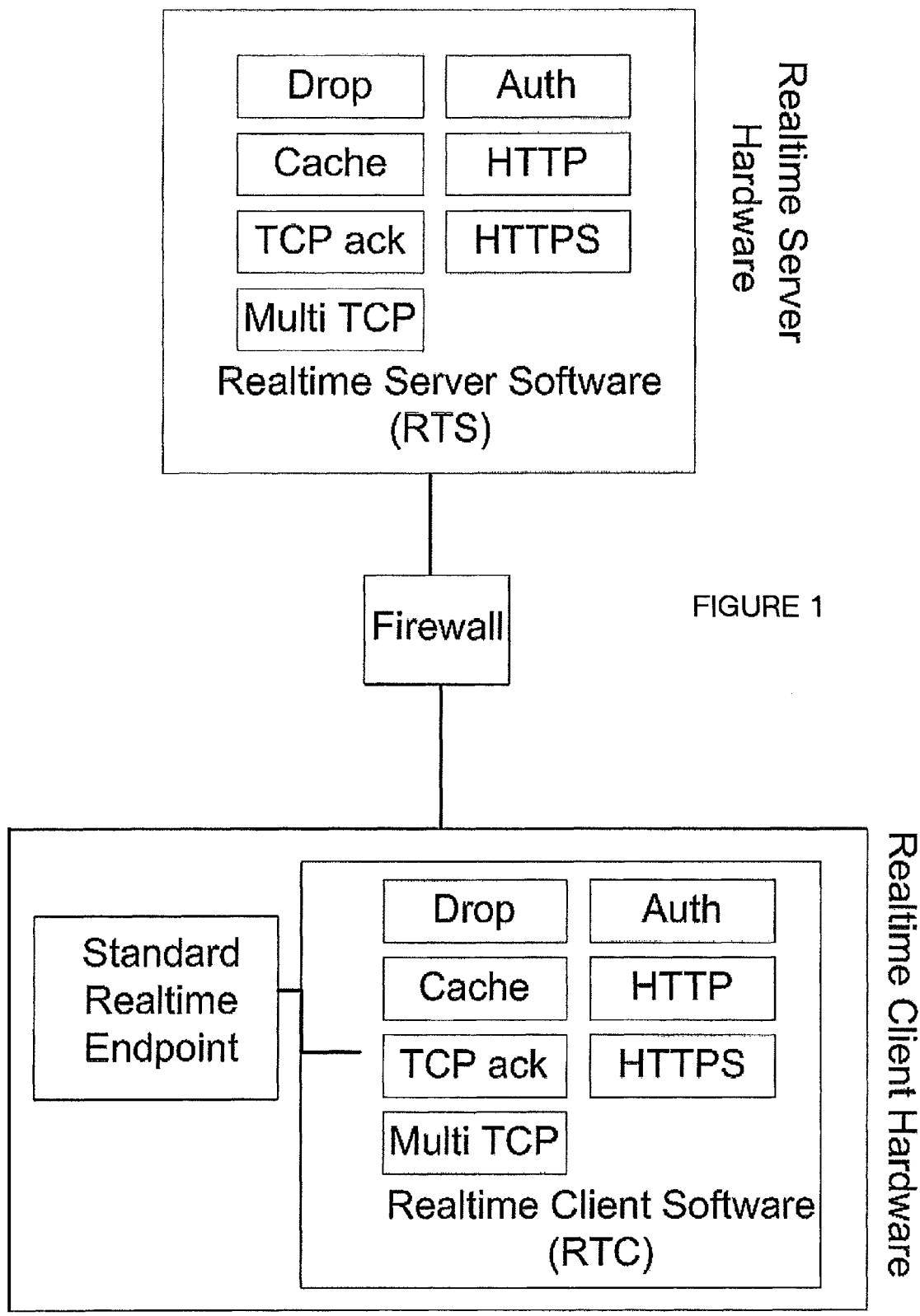

13 Claims, 4 Drawing Sheets

SYSTEM AND METHOD FOR REAL-TIME BIDIRECTIONAL COMMUNICATION THROUGH FIREWALLS

This application is a continuation of US published patent application No. 2005/0108411, filed on Sep. 1, 2004 now abandoned as application Ser. No. 10/931,492 the entire content of which is hereby incorporated by reference.

FIELD OF THE INVENTION

The present invention concerns a system comprising a sender and receiver for high reliability bidirectional data communication in real time through one or more firewalls and optional NAT devices, wherein the sender or receiver is at least one real time client behind the firewall or firewalls or the optional NAT devices, and a real-time server on outside of the firewall or firewalls or the optional NAT devices, or vice versa; as well as a method for high reliability bidirectional data communication in real time through one or more firewalls or optional NAT devices, wherein the method is implemented by a system comprising at least one real time client behind the firewall or firewalls or the optional NAT devices and a real time server outside the firewall or firewalls or optional NAT devices, said real-time client and real time server respectively comprising means for caching and dropping RTP packets in the TCP stream.

In particular the present invention discloses a system and a method for high reliability two-way communication in real-time through one or more firewalls advantageously by way of using HTTP/HTTPS protocols and the use of such an arrangement and method.

BACKGROUND OF THE INVENTION

To protect a PC or network against unauthorized intrusion (hackers), firewalls are used to control all communication. More and more companies and private users install firewalls in order to protect their network. Firewalls do not know all communication protocols on the Internet, so it is necessary with a proxy to let certain protocols through the firewalls. This is in particular the case when the networks are NATed (Network Address Translation, i.e. private addresses are used on the LAN segment). The firewalls today do not handle real-time data well. With the increased usage of such as IP telephony and real-time online games there is a demand for applications that let such traffic through firewalls in a secure way.

There are many different proposals for solutions within this area, however, currently no good solutions exist and no one seems to be on the way.

Some of these solutions are mentioned in the following.
a) Open up for all ports over 1024 to all computers behind the FW. This will work if NAT is not enabled though to a high price due to that hackers from the outside can easily attack all computers behind the FW on all ports over 1024.
b) Use real-time proxies located in the FW's DMZ. The drawback is that operators or corporate personnel etc. have to buy install and configure software for every real-time application someone behind the FW would like to use.
c) Make use of firewall control protocols. Several groups work on standardizing protocols that allow client applications to open and close ports on the FW among others: The MIDCOM group (Middlebox Communication) is an IETF group standardizing such protocols. Their goal is to evaluate different proposals and use the best one as the official standard.
An FCP (Firewall Control Protocol) is developed by Netscreen and Dynamicsoft.
Another FCP protocol is being developed by Netscreen, Dynamicsoft, Microsoft and Checkpoint. This protocol might be the one adopted by MIDCOM. However, standardizing is extremely slow. The background is probably three-parted:
  (i) All such solutions require key and certificate distribution to everybody opening and closing FW ports. This is a huge problem and the reason why Internet payments solutions aren't widely deployed.
  (ii) A security hole is opened.
  (iii) Many of the big firewall vendors do not want to introduce such solutions, partly because of the two reasons mentioned above. Another reason is probably that their business case in this case is threatened. The FW logic is then partly moved from the FW to the FW clients making the FW thinner.
Microsoft has initiated a protocol called UPnP (Universal Plug and Play), which is supported by many PC periphery vendors. This protocol has the same drawbacks as mentioned above. Though, if used in combination with proprietary signalling and only allowing clients on the inside to open up ports, it might get some marked penetration. Corporations and ISPs will, however, never use it due to reduced security.
SOCKS is a protocol that has existed for a long time and can be used for FW traversal. The problems with this protocol as well as the previous one, UPnP, are as described in connection with the FCP protocol developed by Netscreen, Dynamicsoft, Microsoft and Checkpoint.
STUN requires that the FWs must open for UDP traffic from the inside to the outside as well as that responses on the same message must be opened for from the outside to the inside. None of these are common practice to open for in the FW.
d) Separate real-time and data networks. The drawback is that it is expensive to set up and maintain two separate networks instead of one.

PRIOR ART

Arrangements with a sender and receiver for two-way communication in real-time through one or more firewalls wherein the arrangements includes at least a Realtime client (RTC) behind a firewall and a NAT are known from the following US publications: U.S. Pat. No. 6,687,245 B2 (Fangman et al.), US Pat. Appl. No. 2003/0093563 A1 (Young et al.) and US Pat. Appl. No. 2002/0150083 A1 (Fangman et al.). However, all these publications make use of firewall control protocols for opening and closing ports. Hence the problem regarding opening and closing of ports or the use of dedicated hardware.

Further, EP 10811918 A2 discloses how to communicate with computers inside a secure network through the network firewalls. The invention described here does not communicate in true real-time since the server can only respond to a request sent by the client, and not initiate communication. Further the invention breaks the connection after a given time T and then establishes a new connection. This means that the communication is broken for a period of time and cannot be characterised as true real-time which is required for audio/video communication.

SALVET Z: "Enhanced UDP Packet Reflector for Unfriendly Environments" CESNET TECHNICAL REPORT, December 2001, and published Int. Appl. WO 02/11389 A2 both disclose a tunnelling invention, but not a true real-time way to communicate through a firewall. Both describe an invention where RTP is transmitted over TCP, but no consideration is given to the TCP's bad real-time characteristics.

US Pat. Appl. No. 2003/091000 A1 discloses an invention wherein video packets are inspected and categorized into either intra-coded (full) frames or inter-coded (delta) frames. The invention discards inter-coded (delta) frames in case a buffer goes above a certain level. This marginally increases QOS, but has the following limitations: 1) It only works for video, 2) It only works for known/supported codecs (it cannot understand the format used by new codecs). It does not disclose how to establish multiple connections so that data flow is not halted in case of packet loss Finally, US Patent Application No. 2002/0038371, published on Mar. 28, 2002 (Spacey) discloses an invention where clients can access a server (service) that is located on a private network. Spacey does not require any modifications to the private network, firewall or service. This service is not normally accessible for clients outside the private network. There are two reasons for this; firstly, the address of the service is hidden by the NAT in the firewall (private address space) and secondly, clients on the outside are not allowed to make inbound connections towards the server. Spacey solves these two issues by using an intermediary relay server (RS) on the public internet and an intermediary relay client (RC) on the private network. The RS and RC will together act as a relay for the service. The RC will make an outbound connection towards the RS so that two-way traffic may flow (see item b above). The RC will register a virtual address for the service so that RS can route requests to the correct RC (ref issue 1. above).

In short, Spacey concerns connectivity and routing of requests and responses. However, tunnelling real-time data traffic (i.e. RTP/RTCP) through firewalls has detrimental effects on the quality of real-time traffic. Spacey do not provide any methods to improve real-time characteristics of RTP packets tunnelled through one or more firewalls.

From the foregoing it should be evident that there is a need for a reliable and secure solution facilitating real-time bidirectional communication without the need for opening of ports in firewalls or dedicated hardware.

OBJECT OF THE INVENTION

Hence it is an object of the present invention to provide a system and method that eliminate the drawbacks of the prior art discussed hereinabove.

SUMMARY OF THE INVENTION

The above object as well as further features and advantages are realized with a system according to the present invention wherein each of the real-time client and the real-time server comprises at least one bidirectional HTTPS connection wherein the real-time client resides in a client computer for running at least one real time application, wherein each of the real time client and the real-time server comprises at least one bidirectional HTTPS connection or at least at least two unidirectional HTTP connections, wherein the real-time client resides in a client computer for running at least one real-time application, wherein the real-time client and the real-time server each comprises means for caching and means for dropping RTP packets in the TCP stream, and wherein said real-time client is configured to support a HTTP/HTTPS proxy as well as a method according to the present invention wherein the method comprises steps for establishing either at least one bidirectional HTTPS connection, or at least two unidirectional HTTP/HTTPS connections, and establishing the data communication between the real-time client and the real-time server and one or more new HTTP/HTTPS connections before time-out on one or more preceding HTTP/HTTPS connections and subject to disabling Nagle's algorithm.

Further features and advantages shall be apparent from the appended dependent claims. The invention shall be more readily understood by reading the following detailed disclosure in conjunction with the attached drawing figures, of which FIG. 1 shows component parts of an embodiment of the system according to the present invention, FIG. 2 protocols as used with the method of the present invention, FIG. 3 a procedure for TCP ACK, and FIG. 4 how multi-TCP is set in the system according to the present invention.

DETAILED DISCUSSION

In the following, the underlying precepts of the present invention will be described, followed by the specific aspects of the invention. Further, for readability, in the following the wording HTTP is to be understood as HTTP or HTTPS. Still further whenever the wording HTTP or HTTPS appears it is to be understood that HTTP/HTTPS protocols are encapsulated in TCP protocols. Hence TCP HTTP/HTTPS "packets" are by definition TCP packets. Standard abbreviation for relevant technical concepts are used throughout in the following, for brevity's sake. These are defined in the appendix.

The RTC can be deployed in many ways:

As an application at an end-user's desktop.

Integrated with applications, typically gaming applications.

As an application in the FW's DMZ in a corporate setting. The application and FW could be located in any of the following ways:
   a) As a corporate FW DMZ application.
   b) As a residential FW DMZ application.
   c) As an operator/ISP FW DMZ applications.

Integrated with a FW. This could be any type of FW including a personal FW

UDP is nearly always used for two-way real-time connections. HTTP is running over TCP. TCP's drawback is that it does not maintain the good real-time characteristics of UDP. A mechanism for simulating UDP behaviour on TCP has been identified.

A provisioning system may be included for operations like adding user accounts, modifying user accounts, deleting these, check current RTC connections etc.

The goal of the present invention is to let HTTP traffic pass through firewalls and then control all HTTP RTCs and servers, but the present invention does not have to be fully HTTP compliant. This means that all that has to be done to be HTTP compliant in order to bypass firewalls. The HTTP server has many possibilities for being optimized.

High-level Description

FIG. 1 provides an illustration of the functional components on the client (RTC) and server side (RTS)in a preferred embodiment of the present invention. It is the same functional components being present on the client and server side. The functional components are:

1. Cache module. This module implements a mechanism for being able to cache RTP packets in an optimal way on the TCP sender side. A big cache may cause higher delay but also to some extent a smoother RTP stream.
2. Drop module. This module implements a mechanism for being able to drop packets in an optimal way. Packets are dropped when the cache level threshold is exceeded.
3. TCP ack. This module implements a mechanism for improving the TCP throughput of RTP packets. This TCP stack modification may be implemented on the client (RTC) and server side (RTS), but is most convenient to implement on the server side (RTS). When TCP packets are lost, the TCP sender will retransmit the lost packet(s) and will not send new packets before the lost packet(s) are acknowledged from the TCP receiving side. This is no good behaviour for real-time sensitive traffic. On the TCP receiving side, a TCP acknowledge ALWAYS will be provided as though all packets were received.
4. Auth. This module implements a mechanism for authenticating the users before establishing new TCP connections.
5. HTTP. This module implements support for packing RTP packets in an HTTP stream.
6. HTTPS. This module implements support for packing RTP packets in an HTTPS stream.
7. Multi TCP. This module implements support for establishing several TCP channels upon certain conditions for improving the RTP TCP throughput.

Figure 2:
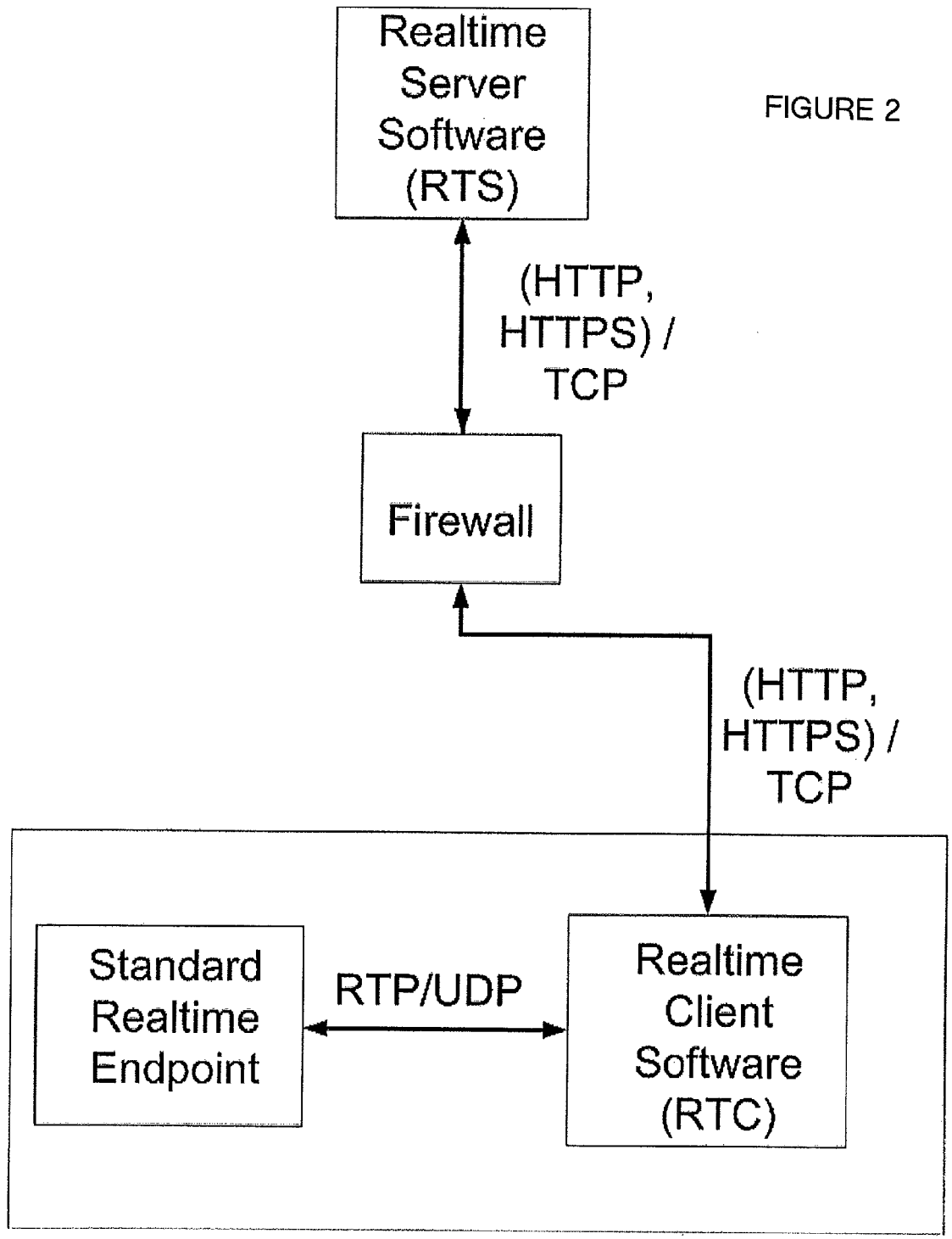

FIG. 2 provides an illustration of the protocols used between the client (RTC) and server (RTS) side, namely TCP, HTTP and HTTPS. Both HTTP and HTTPS are running over the TCP protocol.

Figure 3:
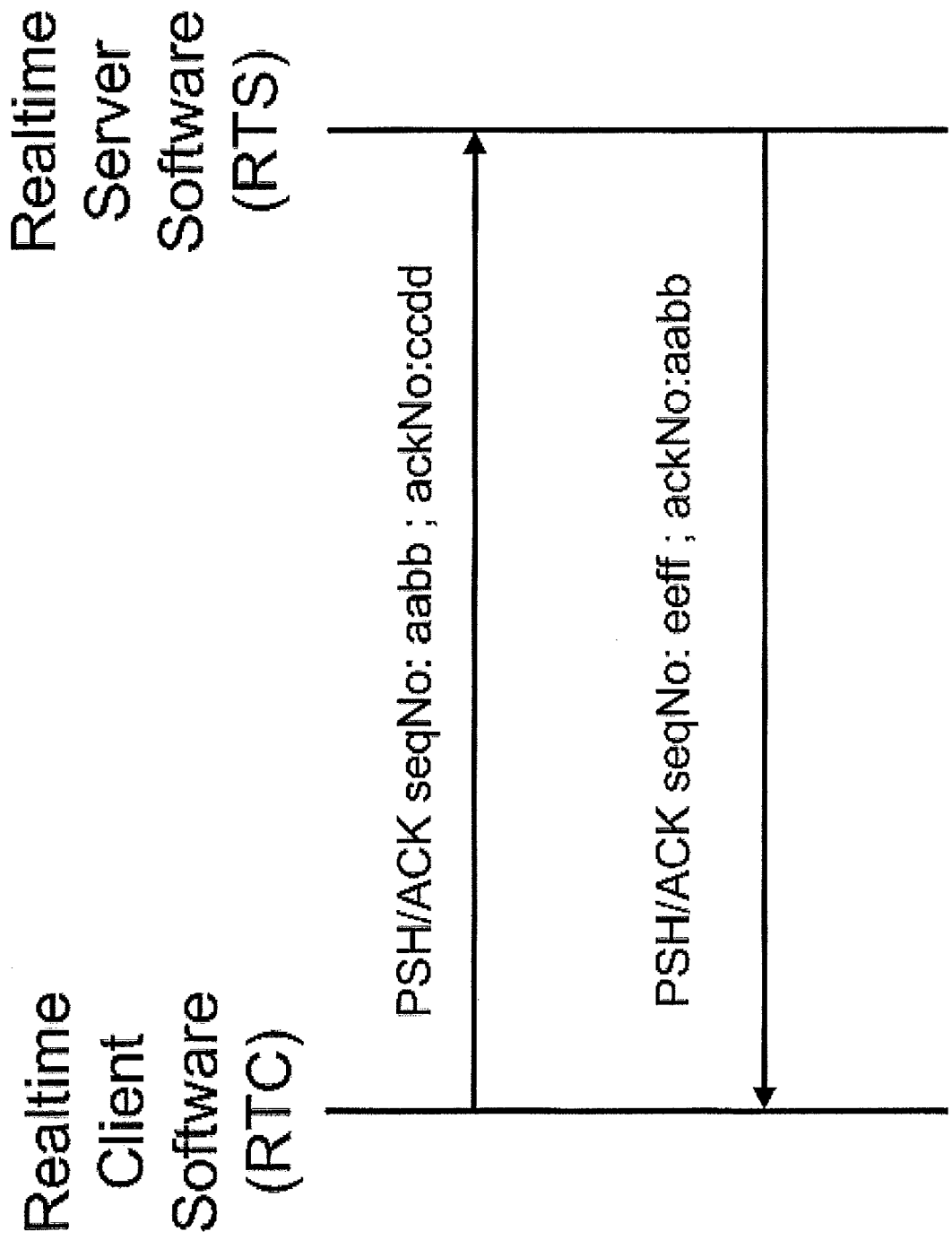

FIG. 3 provides an illustration of the TCP ack functionality as already described in connection with the TCP ack module above for improving the TCP throughput of RTP packets. This TCP stack modification may be implemented on the client (RTC) and server side (RTS), but is most convenient to implement on the server side (RTS). When TCP packets are lost, the TCP sender will retransmit the lost packet(s) and will not send new packets before the lost packet(s) are acknowledged from the TCP receiving side. This is no good behaviour for real-time sensitive traffic. On the TCP receiving side, a TCP acknowledge always will be provided as though all packets were received.

Figure 4:
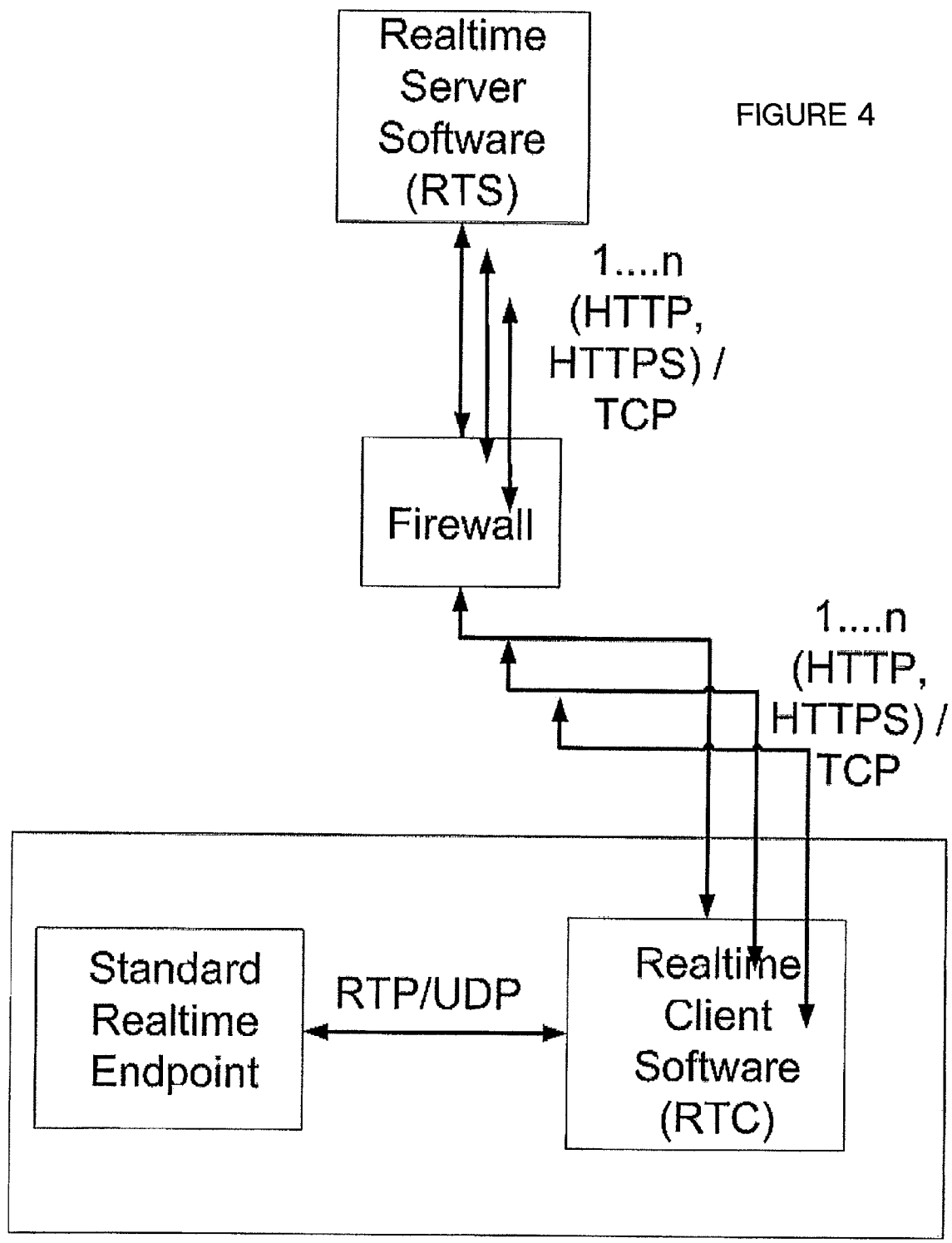

FIG. 4 provides an illustration of a multi TCP arrangement. Under difficult network conditions the RTP TCP throughput may be enhanced by establishing and using several TCP connections instead of only one. Various conditions can be used to spawn new (and later reduce) TCP connections; cache level, drop rate, bandwidth, RTCP, TCP window size and or roundtrip time. The TCP connections are established between the client (RTC) and server (RTS) side typically through a firewall or NAT device.

The real-time application is configured to send data to the RTC, and not the unreachable receiver on Internet. If the RTC is behind an HTTP proxy, the RTC must be configured with the HTTP proxy address and port. If RTC is deployed on a standard operating system HTTP proxy address and port may be automatically extracted from system settings; if not, the user must manually enter the data.

The RTCs will register at start-up towards the RTS according to the present invention.

Media and Signalling Paths

The client side (RTC) SDK (Software Development Kit which is a set of routines, usually stored in one or more libraries, designed to allow developers to more easily write programs for a given computer, operating system or user interface.) provides possibilities for tightly integrating the RTC client into an application running in the same thread or process as the main application. The client side (RTC) SIP proxy provides possibilities for a standard SIP proxy interface towards the main application. The latter gives possibilities for an easier and less tight integration but at the cost of a higher CPU and memory utilization. The latter also offers the possibility for establishing a stand-alone server running the RTC client communicating with any standard endpoint, typically deployed on the corporate LAN network.

The media and signalling path is decomposed and handled by different subsystems on the server side (RS).

RTP Over TCP

When tunnelling RTP in TCP, the RTC and RTS add a header to the RTP data field

The header incorporates information such as the length of the RTP packet and whether the payload is RTP, RTCP or other type. On good networks as well as when Nagle's algorithm is disabled, one TCP packet usually contains one RT header and one RTP packet. One TCP packet can however contain several RT and corresponding RTP packets. One TCP packet can also contain fragments of RTP packets; it is the TCP stack that decides how to fragment the RTP packets.

HTTP Support a) HTTP 1.0 Support

HTTP proxies such as squid only allow one outstanding request, i.e. one GET or POST from the client towards the server. The RESPONSE must be processed before a new GET or POST might be retransmitted. This is the reason why it is important to setup two unidirectional HTTP/TCP connections when handling real-time data, i.e. one connection for transmitting data and one connection for receiving data. It is important to keep the GET or POST outstanding as long time as possible to save bandwidth and processing power. I.e. to spawn a minimum of two TCP channels from each RTC towards a real-time server. One is dedicated for data transmitted from the client towards the server and one from the server to the client, see FIG. 4. When sending new GET/POSTs from the RTC to the real-time server the TCP connection is reused when and as long as possible. It is initiated and established a new pair of HTTP/TCP connections BEFORE one gets timeout on the previous connection pair. Accordingly transmission and receiving on the new connection is started before closing down the old connections, hence a smooth migration from the old connections to the new connections is maintained. On most networks many pairs of TCP connections are required for maintaining real-time data flow.

b) HTTPS Support

The advantage by HTTPS is that on many networks it is possible to use TCP directly after the normal setup procedure.

The setup procedure on networks where HTTPS proxies are required is that the HTTP client, the RTC, sends an HTTP connect message towards the HTTP proxy. The HTTP proxy then sends a response back. In some cases plain TCP can then be used directly between the RTC, the HTTP proxy, the RTS. In other cases SSL have to be used. SSL adds however less overhead than HTTP, at least when encryption can be turned off on the SSL layer.

Authentication of Sessions

Before each new connection is setup from any RTC or other TCP/HTTP client towards a RTS, an authentication procedure before accepting the connection on the application level may be performed. According to the present invention one advantageously has to wait for the first portion of data that includes user credentials and a hashed password before accepting the connection on the RTS side. When the connection is setup, RTS may request re-authentication.

QoS Mechanisms

Improving TCP Real-Time Characteristics by Caching and Dropping Packets

The RTS and RTC have implemented several mechanisms to make TCP get UDP behaviour. One of the features is based on caching and dropping techniques. The Realtime system (RTS+RTCs) has two levels of cache and possibilities for dropping packets.

Cache level 1: Cache level 1 is the TCP sender buffer. In simple RTC implementations (where direct access to the TCP send buffer is not available) it is only possible to detect when cache level 1 is full. In advanced RTC implementations it is also possible to obtain the fill level of cache level 1. The optimal cache size can be dependent on such as throughput, network condition etc.

Cache level 2: It is possible to add a second cache level fully controlled by the RTC. This cache level makes it easier to manage RTP packets. When cache level 1 is reached. Cache level 2 is used for being able to delete whole RTP packets within the cache level 2 buffer. The RTC has full control of the fill level of cache 2.

Drop packets: Packets are dropped as described above when cache levels 1 and 2 are exceeded.

Signalling information is default cached with 64 Kbytes buffers since it is important that this information is forwarded.

Mechanisms for Increasing Bandwidth in Congested Networks

A problem when using TCP as a carrier of real-time data is that one TCP connection does not always provide the necessary throughput for instance due to packet loss or limited bandwidth. This is in particular a problem when transmitting voice codec data. A solution to this problem is to spawn several TCP connections when one TCP connection is not sufficient. It is assumed herein that the new TCP connections are initiated and spawned by the RTC.

Spawn New TCP Connections

Different ways of identifying when to spawn new TCP connections can be one of the following, separately or any preferred combinations Base it on cache parameters.
    Base it on dropped packets.
    Measure bandwidth, i.e. base it on transmitted bytes vs. received bytes.
    Base it on RTCP messages.
    Base it on the TCP window size.
    Base it on roundtrip time.
    Base it on the TCP window size: It is possible to get direct access to the TCP window size when operating on the OS (Operating System) level. For RTCs on client computers that would typically imply making a driver. The TCP window size is the minimum of the sender's congestion window size and the receiver's window size. The TCP window size can be used to decide when to spawn new TCP connections. Typically new channels can be spawned when the TCP window size decreases in size since this might indicate packet loss and a degraded network link.
    Base it on RTCP messages: RTCP reports many parameters that can be used to decide when to spawn new TCP connections. Such parameters are roundtrip time, total number of packets sent vs. received, total number of bytes sent vs. received, packets lost during the last time interval, total number of packets lost etc. New channels can be spawned when e.g. the roundtrip time increase and or when number of lost packets increase.

Base it on roundtrip time: When the roundtrip time between the RTC and server increase, new TCP connections can be spawned. Increased roundtrip time indicates degradation of the network link.

RTCP messages might be a good choice since the RTCP reports are comprehensive and accurate. Cache and drop level is a good alternative. The cache level can then be used for low threshold levels and the drop level for higher threshold levels.

The following protocol is implemented for the purpose of spawning new TCP connections:

The multi protocol between the RTC and RTS is defined with the following messages:

1. RTS->RTC: SetMaxNoOfConnections [STATIC]
2. RTS->RTC: Epsilon [STATIC]

Epsilon can be configured in the RTS and with values between 1 and 2. SetMaxNoOfConnections is configurable in the RTS and the value can be 1 or higher. These parameters will be read by the RTS and passed on to the RTC, used by both the RTS and the RTC. SetMaxNoOfConnections states how many TCP data connections that maximum are allowed to be used (for one media session, i.e. audio call). This parameter is also used both in the RTC and the real-time server. Epsilon states how sensitive the client shall be for spawning new TCP connections.

An overall picture of the transmitting and receiving arrangement for three channels (TCP connections) is illustrated in FIG. 4

Application 1 and Application 2 are an RTC, here respectively depicted as a server and client. Note that number of channels on the originating (Application 1) is independent of the number on the terminating side (Application 2).

Reduce Number of TCP Connections

It is also possible to reduce the number of TCP connections if the network condition improves.

Different Ways of Identifying when to Reduce New TCP Connections can be One of the Following, Separately or any Preferred Combinations Base it on cache parameters.
    Base it on dropped packets.
    Measure bandwidth, i.e. base it on transmitted bytes vs. received bytes.
    Base it on RTCP messages.
    Base it on the TCP window size.
    Base it on roundtrip time.
    Some of these shall now be discussed in more detail.
    Base it on the TCP window size: The TCP window size can be used to decide when to reduce the number of TCP connections. Typically channel(s) can be removed when the TCP window size increase in size since this might indicate a better TCP connection.
    Base it on RTCP messages: Channels can be removed when e.g. the roundtrip time decrease and or when number of lost packets decrease.
    Base it on roundtrip time: When the roundtrip time between the RTC and server decrease, TCP connections can be removed. Decreased roundtrip time indicates an improved network link.

RTCP messages might be a good choice since the RTCP reports are comprehensive and accurate. Cache and drop level is a good alternative. The cache level can then be used for low threshold levels and the drop level for higher threshold levels.

An additional ReduceEpsilon message in the the multi protocol between the RTC and RTS should be added. This number indicates threshold level for how easily the existing TCP connections should be removed when the network condition improves.

Further Details Regarding Spawning and Reducing TCP Connections with Respect to Cache and Drop It is possible to spawn new TCP connections based on any of the following caching criteria:
Cache level 1 is full.
Cache level 2 is full.
Cache level 1 has met a certain threshold level.
Cache level 2 has met a certain threshold level.

It is possible to use the same scheme for reducing the number of TCP connections if the network condition improves.

It is also possible to spawn new TCP connections based on the following drop rate criteria:
The current drop rate. I.e. the drop rate e.g. the last second.
A function of the current drop rate and the previous drop rate(s) weighting the most recent ones highest.

It is possible to use the same scheme for reducing the number of TCP connections if the network condition improves.

Further Details Regarding Spawning and Reducing TCP Connections with Respect to Measurement of Bandwidth More new TCP connections may be spawned when the transmitting rate on one side (RTC or RTS) is higher than the receiving rate at the other side. This involves determining the bandwidth protocol used for this purpose shall now be discussed.

The multi protocol between the RTC and the RTS is defined with the following additional messages:
1. RTS->RTC: SetPollInterval [STATIC]
2. RTS->RTC: PassOnBw [DYNAMIC]

The RTS is configurable with parameter 1 (PollInterval). This parameter is read by the RTS at and directly passed on to the RTC. Parameter 2 (PassOnBw) is dynamic and passed on each time the RTS has calculated received and transmitted bandwidth for a certain period, explained further below.

SetPollInterval indicates how often the RTC and RTS shall calculate transmitted bandwidth.

At certain intervals (the poll interval) the sender and receiver calculate both transmitted bandwidth and received bandwidth. At each poll interval the RTS sends the calculated received and transmitted bandwidth over to the RTC. The RTC accordingly has calculated transmitted and received bandwidth for the same period. The RTC side calculates the new number of channels based on the following algorithm:

if (totalTransmittingBw/totalReceivingBw>epsilon)
    spawn one new TCP connection wherein epsilon e.g. might be 1.04. This means that the senders transmit approximately 4% more than the receivers get. This multi control protocol is designed stateless in order to save complexity and processing power.

It is possible to use the same scheme for reducing the number of TCP connections if the network condition improves.

Spawning New TCP Connections by Means of the Server

In some cases it might be helpful also to let the server side (RTS), initiate new TCP connections. But since TCP connections always are initiated on the client side, this means that the RTC must get a message from the RTS, telling the RTC to spawn a new TCP connection.

This mechanism is advantageous when the bandwidth from the RTC to the RTS is sufficient, but the bandwidth from the RTS to the RTC suffers.

The RTS must send a message to the RTC stating, spawn one or several new TCP connections.

According to the scheme above, the server may also reduce the number of TCP connections.

A scheme for maximizing throughput on steady state connections shall now be discussed.

Assuming no packet loss, the following scheme is optimal for optimizing TCP throughput:
Send subsequent number of RTP packets on the same TCP connection at MAXIMUM according to:
RoundTrip Delay/[Number of TCP connections*ms between each RTP packet]
The sender must at certain intervals; it can be the poll interval previously mentioned, check the roundtrip delay and transmit according to this scheme.

The throughput can be improved by using the best TCP connections

When packet loss is detected it is important not to use congested TCP connections, typically these are TCP connections that have experienced packet loss. Therefore the sender always should rank the available TCP connections. The rank method can be any of the following either separately or in any preferred combination.

Base it on cache parameters, In this connection reference can be made to the section "Mechanisms for increasing bandwidth in congested networks" and caching operations, as also discussed above.

Base it on dropped packets. In this connection reference can be made to section "Mechanisms for increasing bandwidth in congested networks"; and drop, as also discussed above.

Base it on transmitted bytes vs. received bytes. In this connection reference can be made to sections "Mechanisms for increasing bandwidth in congested networks"; "Measure Bandwidth".

Base it on the TCP window size. In this connection reference can be made to section "Mechanisms for increasing bandwidth in congested networks" above.

Base it on roundtrip time. In this connection reference can be made to section "Mechanisms for increasing bandwidth in congested networks" above.

If the ranking procedure results in several 'good' connections, the sender will go through the TCP connections in a round robin manner.

If only congested TCP connections are found, the least congested TCP connection will be used.

If all the TCP connections are congested according to the criteria chosen, the following RTP packets will be dropped until at least one TCP connection can pass on one whole RTP packet.

Theoretical Background of the Present Invention

Suppose the capacity of a single bottleneck between a real-time client and a real-time server is C, and N is the number of other than real-time connections through to bottleneck. Then the total capacity x for n real-time connections through the bottleneck is given by $$x=NC/(N+n).$$

It should be noted that x is the theoretical capacity assuming that all connections behave greedy which is reasonable when the bottleneck capacity is exceeded.

Suppose a router comprise only TCP traffic, let's say 100 TCP connections are running through this router. The RTC has one single TCP connection through this router with a steady state throughput of 8 kbit/s. If the RTC sets up one additional TCP connection through this router, the new combined throughput for these two connections will be:

$$2*[8*1000/*(2*8+1000-8)]=15,87 \text{ kbit/s}.$$

Other Considerations and Optimizations

When the roundtrip delay increases, and Nagle's algorithm is enabled (it is enabled on almost all TCP stacks by default), larger and larger TCP packets are sent to preserve the network condition. When only using one TCP connection between a RTC and a RTS, how many RTP packets are packed into one TCP packet is superfluous. The reason is that TCP when using Nagle's algorithm doesn't send ANY packet before the previous packet is acknowledged (or a full TCP packet is ready to be sent). In case of a packet loss, this means that there will be a full stop in the communication between the RTC and the RTS until the lost TCP packet (and corresponding RTP packets) is resent and acknowledged.

Improving TCP Throughput and Characteristics by Modifying TCP Stack

TCP ack can be improved on the server side as discussed in the following.

Since the server side more easily than the client side may be controlled, there is a possibility to improve the RTS's TCP stack.

When TCP packets are lost, the TCP sender will retransmit the lost packet(s) and won't send new packets before the lost packet(s) are acknowledged from the TCP server side. This is not a desired behaviour for real-time sensitive traffic.

On the server side, i.e. the RTS, an acknowledge will always be given as though all packets are received. The TCP 32-bit acknowledge number of the TCP packet to be equal to the TCP bit sequence number of the last received TCP packet is modified when necessary.

There is no guarantee that a lost TCP segment will contain only whole RTP packets. There is a risk that a segment may contain a fraction of an RTP packet. In case such a segment is lost the problem of getting back into sync with the RTP packets is faced. This is solved by adding a fixed bit pattern (preamble) to every RTP packet. When a TCP segment with a fractional RTP packet is lost, the receiver (RTS) will not find the preamble as expected. RTS now enters hunt-mode. In hunt-mode a search in the byte stream for the first occurrence of the preamble will be performed. When it is found, RTS is back in sync with the RTP packets. There is a risk that the preamble pattern occurs in the RTP data. If this is the case RTS could mistakenly use wrong data as an RTP packet. In this case, the next RTP packet will most likely lack the preamble, and RTS enters hunt-mode again. FIG. 3 shows modified ack behaviour.

This improvement is for traffic sent from the RTC towards the RTS.

Server side RTP TCP retransmission can be improved on the server side, as discussed in the following.

When on the server side (RTS) it is detected that a TCP packet (segment) is lost, the same segment is not retransmitted instead, and a new RTP packet is inserted into that segment before it is retransmitted. This means that one can drop packets that are lost while keeping the receiving TCP stack happy.

A packet loss is caused by congestion (CPU or bandwidth) somewhere along the path from the server to the client. A back-off strategy involves dropping random RTP packets after such a packet loss to lower the probability of another packet loss occurring.

This improvement is for traffic sent from the RTS towards the RTC.

Potentially exactly the same improvements as described in the section Server side TCP ACK improvement and the section Server side RTP TCP retransmission improvement can be applied on the client side.

SSL

SSL/TLS is designed to operate on a reliable connection oriented transport-layer (TCP). SSL/TLS will fail when used on top of RTC's enhanced TCP stack. In this connection reference can be made to TCP ack server side improvement. This is handled in one of two different ways:

Running the enhanced TCP stack on a port range that is used for non-SSL media only.

Modify the SSL record protocol so that it includes a fixed preamble. This preamble is used to find the start of a new SSL record in case a TCP segment is lost. When a TCP segment is lost RTC enters hunt-mode. In the hunt-mode the received byte stream is searched for the preamble. When this is found it is known where the next SSL record starts. RTC also allows the SSL records to have holes in the sequence numbering, but only increasing numbers are allowed (to avoid replay attacks).

ABBREVIATION LIST

NAT Network Address Translation
DMZ DeMilitarized Zone
HTTP Hypertext Transport Protocol
LAN Local Area Network
RTS Real-Time Server
RTC Real-Time Client
SDK Software Development Toolkit
QoS Quality Of Service
PC Personal Computer
FW FireWall
RTP Real-Time Protocol
RTCP Real-Time Communication Protocol
IP Internet Protocol
UDP User Datagram Protocol
TCP Transport Control Protocol
UPnP Universal Plug aNd Play
SOCKS SOCKETS. Authentication firewall traversal
DB DataBase
ISP Internet Service Provider
UPC United Pan-Europe Communications
MSN MicroSoft Network
MSNP MicroSoft Network Protocol
SIP Session Initiation Protocol
SDP Session Description Protocol
SSL/TLS Secure Sockets Layer/Transport Layer Security
UA User Agent
IE Internet

The invention claimed is:

1. A non-transitory, computer-accessible memory medium storing program instructions for communication between a real-time client and a real-time server, wherein the program instructions are executable by a processor to:

establish at least one bidirectional connection to the real-time server through at least one of one or more firewalls or one or more NAT devices, wherein the at least one bidirectional connection comprises at least one bidirectional HTTPS connection or at least two unidirectional HTTP connections;

receive a first one or more RTP packets of a real-time application;

provide a first one or more TCP packets to the real-time server via the at least one bidirectional connection, wherein the first one or more TCP packets comprise the first one or more RTP packets;

receive a second one or more TCP packets from the real-time server via the at least one bidirectional connection;

extract a second one or more RTP packets from the second one or more TCP packets; and provide at least one of the second one or more RTP packets to the real-time application;

wherein the program instructions are further executable to provide an acknowledgement to the real-time server for each TCP packet regardless of whether or not the TCP packet is received, and if a TCP packet is lost, modify a TCP 32-bit acknowledge number of the TCP packet to be equal to a TCP bit sequence number of a last received TCP packet.

2. The non-transitory, computer-accessible memory medium of claim 1, wherein the at least one bidirectional connection comprises a plurality of bidirectional connections, wherein each bidirectional connections comprises a bidirectional HTTPS connection or two unidirectional HTTP connections.

3. The non-transitory, computer-accessible memory medium of claim 1, wherein the program instructions are further executable to:

cache the second one or more RTP packets in a buffer; and drop at least an RTP packet of the second one or more RTP packets from the buffer, leaving a third one or more RTP packets in the buffer;

wherein said providing comprises providing the third one or more RTP packets to the real-time application.

4. The non-transitory, computer-accessible memory medium of claim 1, wherein the program instructions are further executable to establish at least one additional bidirectional connection to perform communication between the real-time server and the real-time client.

5. The non-transitory, computer-accessible memory medium of claim 4, wherein said establishing the at least one additional bidirectional connection is performed based on one or more of the following conditions:

a first cache level is full;

a second cache level is full;

the first cache level has reached a predetermined threshold level;

the second cache level has reached a predetermined threshold level;

a rate of dropping packets has reached a predetermined drop rate level;

a function of a current drop rate and one or more previous drop rates is satisfied; or a ratio between a total transmitted bandwidth and a total receiving bandwidth exceeds a predetermined threshold with reference to the real-time client.

6. The non-transitory, computer-accessible memory medium of claim 4, wherein the program instructions are further executable to reduce the number of bidirectional connections based on one or more of the following conditions:

a first cache level is empty;

a second cache level is empty;

the first cache level has reached a predetermined threshold level;

the second cache level has reached a predetermined threshold level;

a rate of dropping packets has reached a predetermined drop rate level;

a function of a current drop rate and a previous drop rate or drop rates are satisfied; or a ratio between the total transmitted bandwidth and the total receiving bandwidth exceeds a predetermined threshold with reference to the real-time client.

7. The non-transitory, computer-accessible memory medium of claim 4, wherein the program instructions are further executable to rank a best available bidirectional connection according to one or more of the following conditions:

a first cache level is full;

a second cache level is full;

the first cache level has reached a predetermined threshold level;

the second cache level has reached a predetermined threshold level;

a rate of dropping packets has reach a predetermined drop rate level;

a function of a current drop rate and a previous drop rate or drop rates are satisfied; or ratio between a total transmitted bandwidth and the total receiving bandwidth exceeds a predetermined threshold with reference to the real-time client.

8. A non-transitory, computer-accessible memory medium storing program instructions for communication between a real-time client and a real-time server, wherein the program instructions are executable by a processor to:

establish at least one bidirectional connection to the real-time client through at least one of one or more firewalls or one or more NAT devices, wherein the at least one bidirectional connection comprises at least one bidirectional HTTPS connection or at least two unidirectional HTTP connections;

receive a first one or more RTP packets of a real-time application;

provide a first one or more TCP packets to the real-time client via the at least one bidirectional connection, wherein the first one or more TCP packets comprise the first one or more RTP packets;

acknowledge receipt of each of the first one or more TCP packets, regardless of whether or not the TCP is received by the real-time client, wherein said acknowledging comprises using a TCP 32-bit acknowledge number of a last provided TCP packet;

receive a second one or more TCP packets from the real-time client via the at least one bidirectional connection;

extract a second one or more RTP packets from the second one or more TCP packets; and provide at least one of the second one or more RTP packets to the real-time application.

9. The non-transitory, computer-accessible memory medium of claim 8, wherein the at least one bidirectional connection comprises a plurality of bidirectional connections, wherein each bidirectional connections comprises a bidirectional HTTPS connection or two unidirectional HTTP connections.

10. The non-transitory, computer-accessible memory medium of claim 8, wherein the program instructions are further executable to:

cache the second one or more RTP packets in a buffer; and drop at least an RTP packet of the second one or more RTP packets from the buffer, leaving a third one or more RTP packets in the buffer;

wherein said providing comprises providing the third one or more RTP packets to the real-time application.

11. The non-transitory, computer-accessible memory medium of claim 8, wherein the program instructions are further executable to establish at least one additional bidirectional connection to perform communication between the real-time server and the real-time client.

12. The non-transitory, computer-accessible memory medium of claim 11, wherein said establishing the at least one additional bidirectional connection is performed based on one or more of the following conditions:

a first cache level is full;

a second cache level is full;

the first cache level has reached a predetermined threshold level;

the second cache level has reached a predetermined threshold level;

a rate of dropping packets has reach a predetermined drop rate level;

a function of a current drop rate and a previous drop rate or drop rates are satisfied; or a ratio between the total transmitted bandwidth and the total receiving bandwidth exceeds a predetermined threshold with reference to the real-time client.

13. The non-transitory, computer-accessible memory medium of claim 8, wherein the program instructions are further executable to add a fixed bit pattern to every RTP packet.

* * * * *